(12) United States Patent
Boteas et al.

(10) Patent No.: US 10,606,548 B2
(45) Date of Patent: Mar. 31, 2020

(54) METHOD OF GENERATING AN AUDIO SIGNAL

(71) Applicant: Krotos Ltd, Edinburgh (GB)

(72) Inventors: Orfeas Boteas, Edinburgh (GB);
Matthew Collings, Edinburgh (GB);
Douglas Barr, Inverness (GB)

(73) Assignee: Krotos Ltd, Edinburgh (GB)

( * ) Notice: Subject to any disclaimer, the term of this patent is extended or adjusted under 35 U.S.C. 154(b) by 0 days.

(21) Appl. No.: 15/625,462

(22) Filed: Jun. 16, 2017

(65) Prior Publication Data
US 2018/0364967 A1 Dec. 20, 2018

(51) Int. Cl.
*G06F 17/00* (2019.01)
*G06F 3/16* (2006.01)
*G10L 25/51* (2013.01)
*G06F 16/632* (2019.01)

(52) U.S. Cl.
CPC ........... *G06F 3/165* (2013.01); *G06F 16/634* (2019.01); *G10L 25/51* (2013.01)

(58) Field of Classification Search
CPC ............. G11B 27/036; H04N 21/4542; H04N 21/23424; H04N 21/44016; G06F 17/30743
See application file for complete search history.

(56) References Cited

U.S. PATENT DOCUMENTS

| | | | |
|---|---|---|---|
| 9,665,644 B1* | 5/2017 | Song ................ | G06F 17/30743 |
| 2003/0160944 A1* | 8/2003 | Foote ................ | G03B 31/00 352/1 |
| 2005/0268317 A1* | 12/2005 | Cormack ............. | H04H 60/37 725/25 |
| 2006/0028951 A1* | 2/2006 | Tozun ................ | G11B 3/64 369/84 |
| 2009/0055189 A1* | 2/2009 | Stuart ................ | H04H 20/106 704/270 |
| 2011/0276157 A1* | 11/2011 | Wang ................ | G06F 17/30861 700/94 |
| 2014/0254831 A1* | 9/2014 | Patton ............... | H03G 3/20 381/107 |
| 2015/0058709 A1* | 2/2015 | Zaletel ............... | H04L 65/608 715/202 |

* cited by examiner

*Primary Examiner* — Thomas H Maung
(74) *Attorney, Agent, or Firm* — Alston & Bird LLP (57) ABSTRACT

A method of generating a composite audio signal, comprising: receiving an input audio signal; performing a first comparison, wherein at least a first portion of the input audio signal is compared with at least a portion of one or more stored audio signals; selecting at least a first portion of a stored audio signal based on a result of the first comparison; performing a second comparison, wherein at least a second portion of the input audio signal is compared with at least a portion of one or more stored audio signals; selecting at least a second portion of a stored audio signal based on a result of the second comparison; and generating the composite audio signal using at least the selected first and second portions of a stored audio signal.

26 Claims, 6 Drawing Sheets

METHOD OF GENERATING AN AUDIO SIGNAL

BACKGROUND

Technical Field

The present disclosure relates to apparatus and methods for generating a composite audio signal. In particularly, but not exclusively, the disclosure relates to apparatus and methods for generating a composite audio signal from at least two sequential stored audio signals so that it resembles a received audio signal.

Related Art

It is a common requirement in the production of movies that an actor's voice has to be modified to suit the character being played. For instance, the character may be some form of speaking animal or monster or alien. Typically, a sound engineer will modify the actor's voice using a range of audio effects, such as distortion, pitch shifting and various types of modulation. However, this can be time consuming and difficult to achieve the desired sound. In particular, this approach is usually unsatisfactory for reproducing, say, a certain type of animal sound. The conventional alternative to this is to manually select recorded samples of the animal sounds and include these in the output audio signal. However, this can be even more time consuming and it is difficult to maintain the integrity and clarity of the dialogue.

An audio plugin created by the Applicant comprises a trigger function, wherein the trigger function enables playback of specific section of an audio sample that is triggered by a characteristic of the input audio signal. For example, playback of the section of the audio sample may be triggered when the input audio signal exceeds a minimum amplitude. The trigger function offers limited scope to generate a new audio signal on its own, as it is restricted to playback of a section of an audio sample when a condition is met. To generate a new audio signal, the plugin must apply a number of additional features such as audio effects, processing of the input audio signal and audio sample, and playback of multiple audio samples in parallel.

An application created by Shazam allows a user to identify a song that is currently playing. The app analyses the input audio signal and matches characteristics of the input audio signal to a database of known stored audio signals in the form of songs. When the application finds a match it informs the user of the song name and artist. The application does not allow the generation of new content, it is limited to the playback of existing stored songs.

Other systems receive a non-audio input and selectively start playback or stop playback of audio samples based on characteristics of the non-audio input. Music in video games can be responsive to a player's actions in the game. For example, by entering a specific area or encountering an enemy, the audio is altered to reflect the situation and create a more immersive experience. This is achieved by stopping an audio sample that is currently playing, and playing a different audio sample or by playing multiple audio samples simultaneously.

In the case of an in-car satellite navigation (sat nav) system, the sat nav receives an input relating to the current position of the car and forms an output audio signal to direct the driver to their destination. The output audio signal may comprise a pre-recorded sample describing an action, and a pre-recorded sample stating a distance after which the action should be performed. Announcements on a train listing the stops on a route comprise pre-recorded audio samples of each destination. The names of the stops and the order that they are listed will be generated based on the train route and the destinations. In the cases of the sat nav and train announcement, the input is typically one unchanging quantity, namely the destination, and the output is a list of information that is compiled and played back to the user.

BRIEF SUMMARY

According to a first aspect of the present disclosure there is provided a method of generating a composite audio signal, comprising: receiving an input audio signal; performing a first comparison, wherein at least a first portion of the input audio signal is compared with at least a portion of one or more stored audio signals; selecting at least a first portion of a stored audio signal based on a result of the first comparison; performing a second comparison, wherein at least a second portion of the input audio signal is compared with at least a portion of one or more stored audio signals; selecting at least a second portion of a stored audio signal based on a result of the second comparison; and generating the composite audio signal using at least the selected first and second portions of a stored audio signal.

Optionally, the generated composite audio signal comprises a plurality of sequential portions of a stored audio signal.

Optionally, each stored audio portion is of a fixed duration. Optionally, each portion of input audio signal is of equal duration and is of the same duration as that of each stored audio portion.

Optionally, each stored audio portion begins at a peak in amplitude of a stored audio signal.

Optionally, the input audio signal is separated into a plurality of portions as it is being received.

Optionally, the or each stored audio signal is characterised in terms of one or more audio parameters. Optionally, the or each stored audio signal is characterised prior to performing the first comparison.

Optionally, the first comparison comprises: analysing the first portion of the input audio signal; characterising the analysed first portion of the input audio signal in terms of one or more audio parameters based on the analysis; and comparing the or each audio parameter of the first portion with the or each corresponding stored audio parameter.

Optionally, the method includes, after a first time period, determining a first similarity score based on the similarity between the input audio signal and the selected first portion of stored audio signal.

Optionally, the method includes continuing to generate the composite audio signal using the selected first portion of stored audio signal If the first similarity score is above a predetermined similarity threshold.

Optionally, the method includes performing the second comparison If the first similarity score is below the predetermined similarity threshold.

Optionally, the second comparison comprises a first search for identifying a sub-set of stored audio portions that are potential candidates for a best match with the second portion of the input audio signal.

Optionally, the first search identifies a best matching primary audio parameter of the stored audio portions.

Optionally, the second comparison comprises: analysing the second portion of the input audio signal; characterising the analysed second portion of the input audio signal in terms of one or more audio parameters based on the analysis;

and comparing the or each audio parameter of the second portion with the or each corresponding audio parameter of the sub-set of stored audio portions.

Optionally, the analysis of the second comparison comprises calculating a normalised distance between one or more audio parameters of the input audio portion and the corresponding audio parameter of each of the sub-set of stored audio portions.

Optionally, the method includes weighting one or more of the calculated normalised distances.

Optionally, the stored audio signals comprise at least one of animal, alien and monster sounds.

Optionally, the generated composite audio signal comprises a plurality of parallel audio signals.

Optionally, each of the plurality of parallel audio signals comprises a plurality of stored audio portions. Optionally, each of the stored audio sections has the same duration.

Optionally, the start time of each of the plurality of parallel audio signals is offset. Optionally, the offset comprises the inverse ratio of the number of parallel audio signals used.

According to a second aspect of the present disclosure there is provided an apparatus adapted to generate a composite audio signal, comprising: an input for receiving an input audio signal; a memory for storing one or more audio signals; and a processor adapted to: perform a first comparison, wherein at least a first portion of the input audio signal is compared with at least a portion of one or more stored audio signals; select at least a first portion of a stored audio signal based on a result of the first comparison; perform a second comparison, wherein at least a second portion of the input audio signal is compared with at least a portion of one or more stored audio signals; select at least a second portion of a stored audio signal based on a result of the second comparison; and generate the composite audio signal using at least the selected first and second portions of a stored audio signal.

Optionally, the apparatus comprises a plugin for a digital audio workstation or a library for audio processing in real-time. The apparatus may also be provided as audio middleware for gaming or other application areas, in applications for mobile devices, or generally in any digital audio environment.

According to a third aspect of the present disclosure there is provided a non-transitory computer program product comprising instructions for generating a composite audio signal, comprising: receiving an input audio signal; performing a first comparison, wherein at least a first portion of the input audio signal is compared with at least a portion of one or more stored audio signals; selecting at least a first portion of a stored audio signal based on a result of the first comparison; performing a second comparison, wherein at least a second portion of the input audio signal is compared with at least a portion of one or more stored audio signals; selecting at least a second portion of a stored audio signal based on a result of the second comparison; and generating the composite audio signal using at least the selected first and second portions of a stored audio signal.

The computer program product may be stored on or transmitted as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fibre optic cable, twisted pair, digital subscriber line (DSL), or wireless technologies such as infra-red, radio, and microwave, then the coaxial cable, fibre optic cable, twisted pair, DSL, or wireless technologies such as infra-red, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

BRIEF DESCRIPTION OF THE FIGURES

The disclosure is described below, by way of example only and with reference to the accompanying drawings, in which.

DETAILED DESCRIPTION OF VARIOUS EMBODIMENTS

Figure 1:
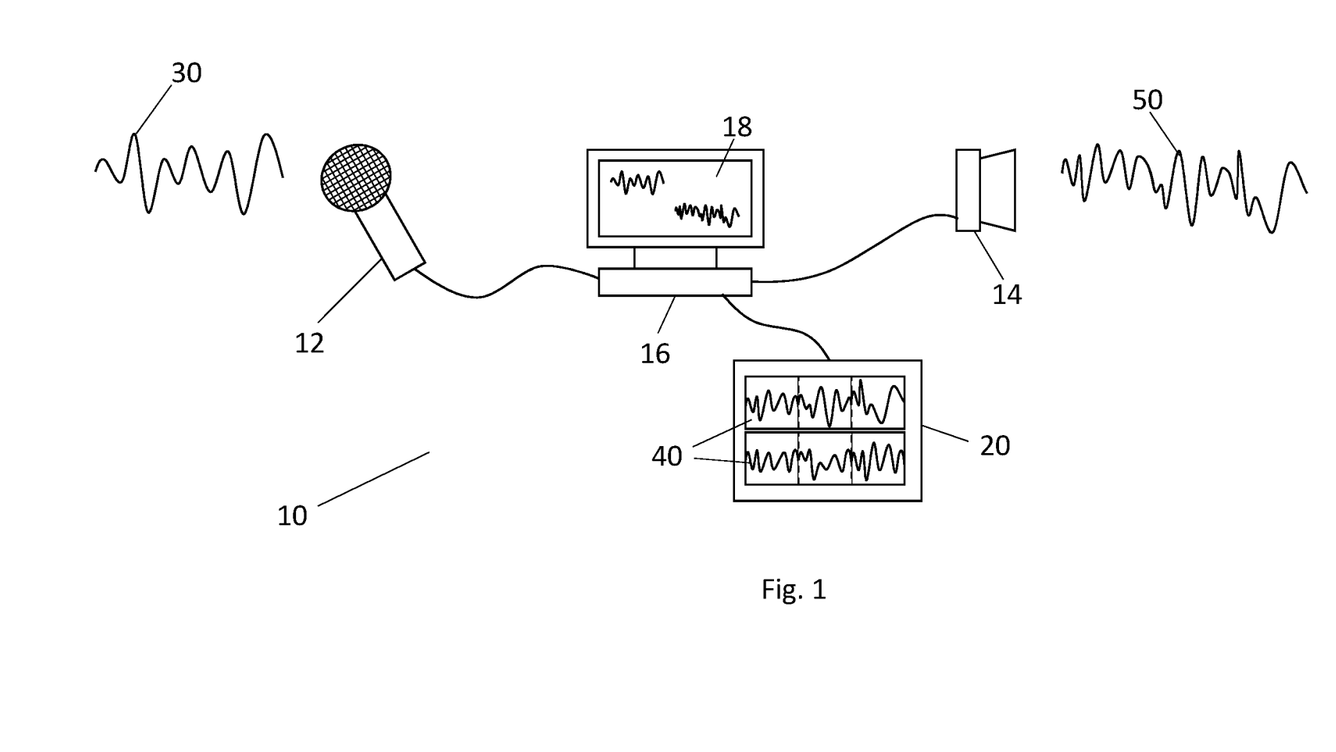
FIG. 1 shows a schematic view of an apparatus for generating a composite audio signal in accordance with the disclosure.

FIG. 1 illustrates apparatus 10 for generating a composite audio signal 50 which resembles an input audio signal 30. The term 'composite audio signal' is intended to mean an audio signal formed using two or more separate audio signals.

The composite audio signal 50 comprises a plurality of sections of stored audio signals 40. The stored audio signals 40, which also may be referred to as audio samples, are pre-recorded and may (as non-limiting examples) include samples such as animal noises, robotic sounds or "monster" noises. The audio samples 40 may be stored in a digital storage medium 20, such as a hard drive, a flash drive or a compact disk. A class of related audio samples may be used during operation, for example a class comprising only audio samples of tigers.

An input audio signal 30, for example corresponding to a user's voice, is received at an input, for example a microphone 12. The input audio signal 30 will be processed using the present method 100 and will be transformed depending on the class of audio samples 40 that has been selected. For example, by selecting the class comprising only audio samples of tigers, the user's voice will drive a selection of samples, composed into a composite audio signal that resembles a tiger.

Each stored audio signal is typically around a few seconds in duration, for example a single tiger roar. Each stored audio signal 40 is separated into a plurality of stored audio sections, which may be also be referred to as portions of the stored audio signal. Each stored audio section is typically less than a second in duration. In an alternative embodiment, the stored audio signals 40 are not divided into stored audio sections but rather are separate audio samples. In a "multi-voice" implementation (described below), these sections in one non-limiting implementation are always 256 samples in length, starting at sample 0 in all audio files, and proceeding with the same division, so that they are divided into stored audio sections.

The generated composite audio signal 50 comprises a plurality of sequential sections of audio samples 40, each of which has been selected based on its similarity to the corresponding portion of the input audio signal 30. The generated composite audio signal 50 will therefore be responsive to variations in the input audio signal, rather than being restricted to the playback or "triggering" of a single audio sample.

This process is preferably performed in real time, wherein the composite audio signal 50 is generated and played through a speaker 14 as the input audio signal 30 is received and processed, thereby corresponding to a live performance. The composite audio signal 50 is also preferably post processed to have the same amplitude envelope as the input audio signal 30 by using real-time envelope following.

The present method 100 is implemented on a computer system 16 using a plugin or library for real-time digital audio processing, for example for a digital audio workstation (DAW) 18. Plugins are employed to process audio in DAW software, which is used to record, edit and playback audio. Alternatively, the method 100 may be implemented in a mobile application ("app") or middleware for game or other audio.

It will be appreciated that there are alternatives to the microphone 12 for receiving the input audio signal 30. For example, the input audio signal 30 may be received from the digital storage medium 20 and comprise a separate stored audio sample.

Also, the composite audio signal 50 may be recorded to the digital storage medium 20 in addition to, or as an alternative to, playback through the speaker 14.

Figure 2:
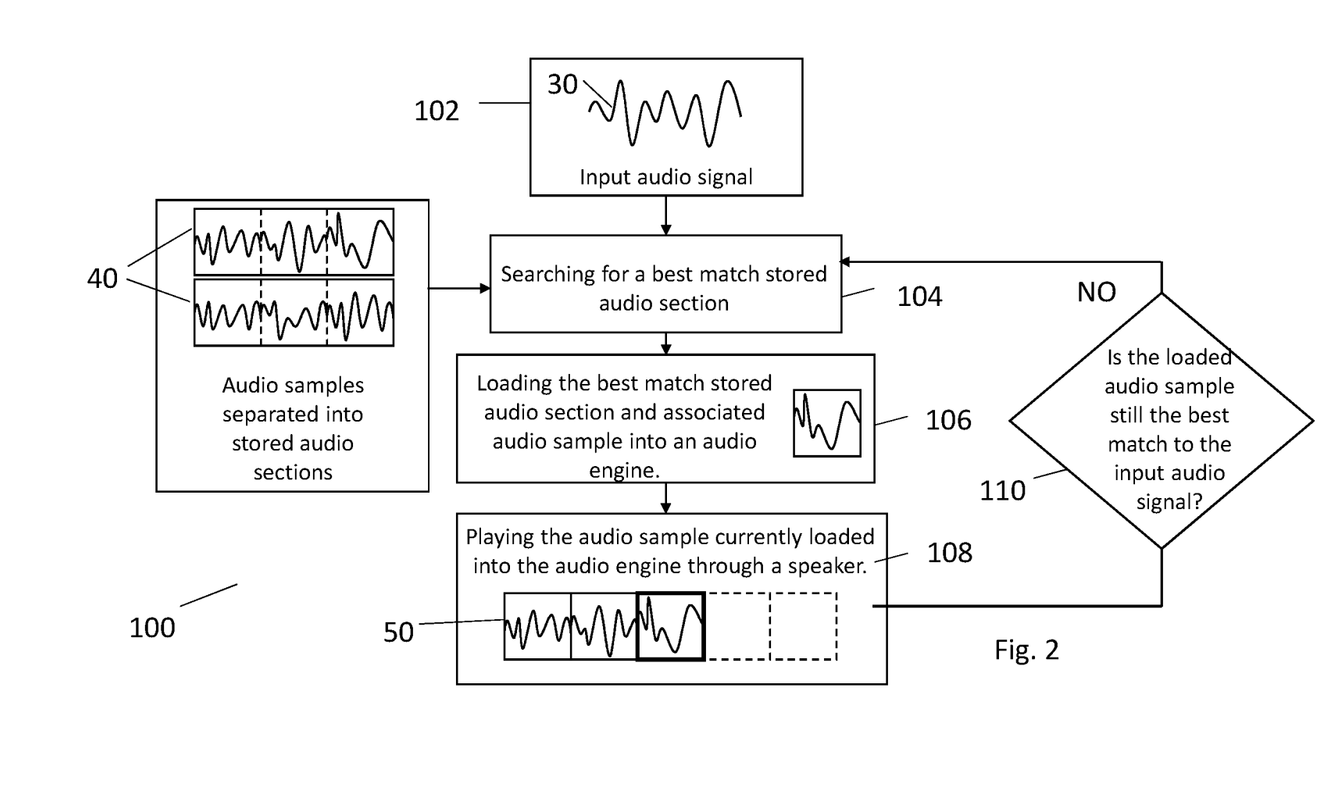
FIG. 2 shows a flow chart illustrating a first embodiment of a method of generating the composite audio signal in accordance with the disclosure.

FIG. 2 illustrates a first embodiment of the method 100 of generating the composite audio signal 50. At step 102 an input audio signal 30, for example a user's voice, is received at the microphone 12 coupled to the computer system 16 that is running the plugin or library 18.

A first time portion of the input audio signal 30 is analysed. This first portion has a duration which is the same or similar to that of the stored audio sections. At step 104 a first comparison is performed in which a search algorithm is used to find a best match stored audio section for the first portion of the input audio signal 30. Similarity is based on such features or audio parameters as frequency and amplitude, and will be described in more detail below. The measure of similarity of the first portion of the input audio signal 30 to each of the stored audio sections is defined in terms of a first similarity score, which is also described below. At step 106 the audio sample comprising the best match stored audio section is loaded into an audio engine, starting from the beginning of the best match stored audio section. At step 108 the audio sample loaded into the audio engine is played back through the speaker 14, wherein playback begins from the start of the best match stored audio section.

A subsequent time portion of the input audio signal 30 is then analysed. Both the input audio signal 30 and the audio sample vary with time as the user varies their vocalisations and the audio sample loaded into the audio engine is played. Therefore, it is unlikely that the input audio signal 30 will maintain a high degree of similarity to the audio sample loaded into the audio engine for a substantial period of time. The audio engine continues to play back the audio sample until it no longer constitutes a best match to the input audio signal 30, shown by step 110, or the audio sample ends. The measure of similarity of the input audio signal 30 to the audio sample loaded into the audio engine is defined in terms of a second similarity score, wherein if the second similarity score falls below a similarity threshold, the audio sample is considered to no longer constitute a best match to the input audio signal 30. If this occurs, a second comparison is performed in which the search algorithm is used to find a new best match stored audio section for the second portion of the input audio signal 30. A new audio sample comprising the new best match stored audio section is loaded into the audio engine and played back through the speaker 14, wherein playback begins from the start of the new best match stored audio section. This process repeats for the duration of the input audio signal 30, thereby generating the composite audio signal 50.

To assess the similarity of the input audio signal 30 to the stored audio sections it is necessary to analyse the input audio signal 30 and stored audio sections to characterise them in terms of a plurality of audio parameters. The audio parameters resulting from characterisation are stored as numerical values in a database.

The audio parameters may for example comprise one or more of the parameters from the following list: root mean square (RMS) amplitude, peak energy, spectral centroid, spectral flatness, spectral kurtosis, MFCC, McLeod pitch and energy difference. Analysis of the input audio signal 30 and the stored audio sections to characterise them in terms of the audio parameters is performed by a combination of Fourier Transform and time domain processing. For example, the spectral centroid may be produced using Fourier Transform, while RMS and peak energy would be determined in the time domain.

The stored audio sections are analysed and characterised in advance of the method 100 being carried out on a computer system 16 (when the input audio signal 30 is received). This is to reduce the requirements of the computer processor as the method 100 is being performed and the input audio signal 30 is being processed.

As the input audio signal 30 varies with time, the audio parameters associated with the input audio signal 30 will also vary. Therefore, it is necessary to periodically analyse and characterise the input audio signal 30. This is achieved by separating the input audio signal 30 into input audio portions, wherein each input audio portion is representative of the input audio signal 30 at a specific time. The input audio portions undergo analysis and characterisation sequentially, in real time, as the input audio signal 30 is received and the input audio portions are defined. Alternatively, the input audio signal 30 may correspond to an audio signal held in the digital storage medium 20, which is separated into sections that undergo analysis and characterisation simultaneously, and in advance of application of the method 100 to generate the composite audio signal 50.

Figure 3:
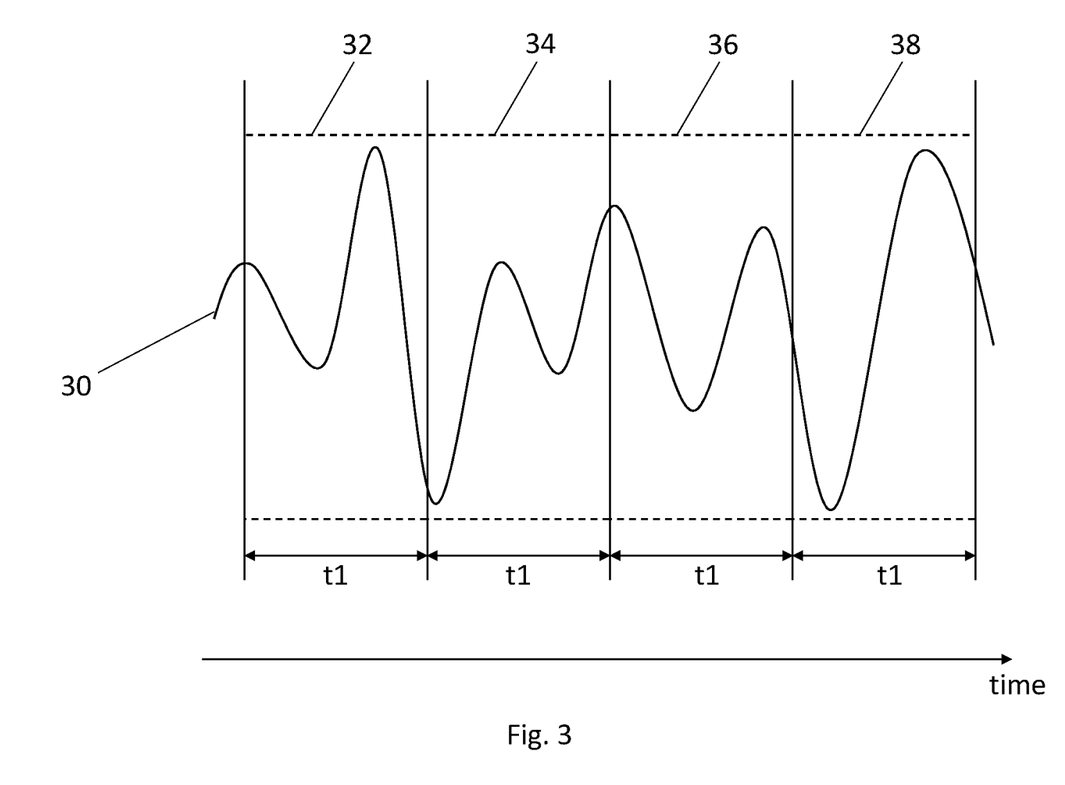
FIG. 3 shows an input audio signal separated into a plurality of input audio portions.

FIG. 3 illustrates how the input audio signal 30 is separated into a plurality of input audio portions, illustrated by a first input audio portion 32, a second input audio portion 34, a third input audio portion 36 and a fourth input audio portion 38. All input audio portions are the same length, corresponding to a time period t1.

Figure 4:
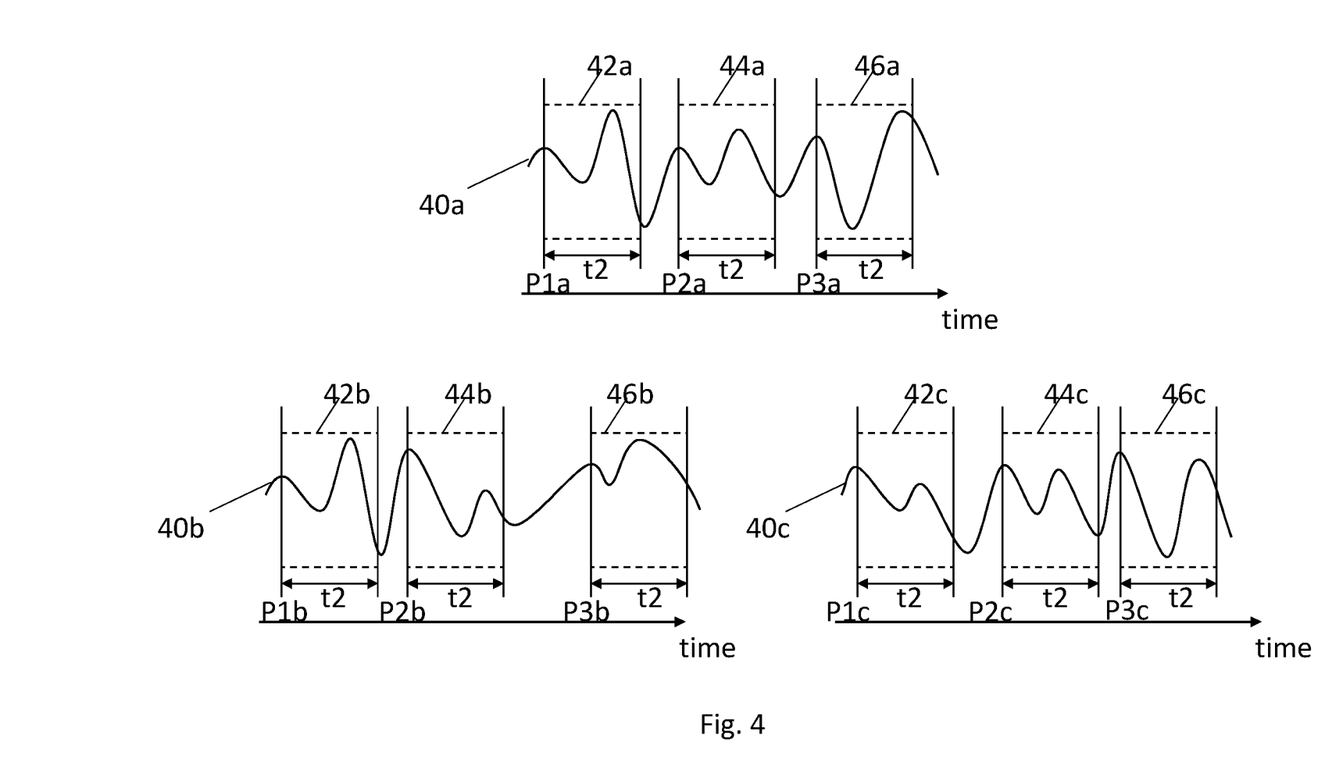
FIG. 4 shows a plurality of stored audio signals, wherein each stored audio signal is separated into a plurality of stored audio sections.

FIG. 4 illustrates how the audio samples 40 are separated into a plurality of stored audio sections using an amplitude location algorithm. The stored audio sections are determined by time periods between these locations in the audio sample. The audio samples 40a, 40b, 40c are separated into a plurality of stored audio sections as illustrated in FIG. 4. A first audio sample 40a comprises a first stored audio section 42a, a second stored audio section 44a and a third stored audio section 46a. A second audio sample 40b comprises a first stored audio section 42b, a second stored audio section 44b and a third stored audio section 46b. A third audio sample 40c comprises a first stored audio section 42c, a second stored audio section 44c and a third stored audio section 46c. All stored audio sections are the same length in time, corresponding to a time period t2.

At a time P1a, there is a first peak in the first audio sample 40a. The first peak at P1a corresponds to the start of the first stored audio section 42a. After the time period t1 has elapsed, the next peak of the first audio sample 40a occurs at a time P2a. The peak at P2a corresponds to the start of the second stored audio section 44a. After the time period t1 has elapsed, the next peak of the first audio sample 40a occurs at a time P3a. The peak at P3a corresponds to the start of the third stored audio section 46a.

The second audio sample 40b includes peaks corresponding to the start of stored audio sections at P1b, P2b, P3b. The third audio sample 40c includes peaks corresponding to the start of stored audio sections at P1c, P2c, P3c.

The stored audio sections are sampled at a frequency such that each section is represented by $2^n$ blocks of data, where n is an integer. For example, this may correspond to 512 or 1024 blocks.

In other embodiments of the disclosure, other ways to separate the audio samples into stored audio sections may be used, such as contiguous sections, wherein there is no time delay between each stored audio section.

Figure 5:
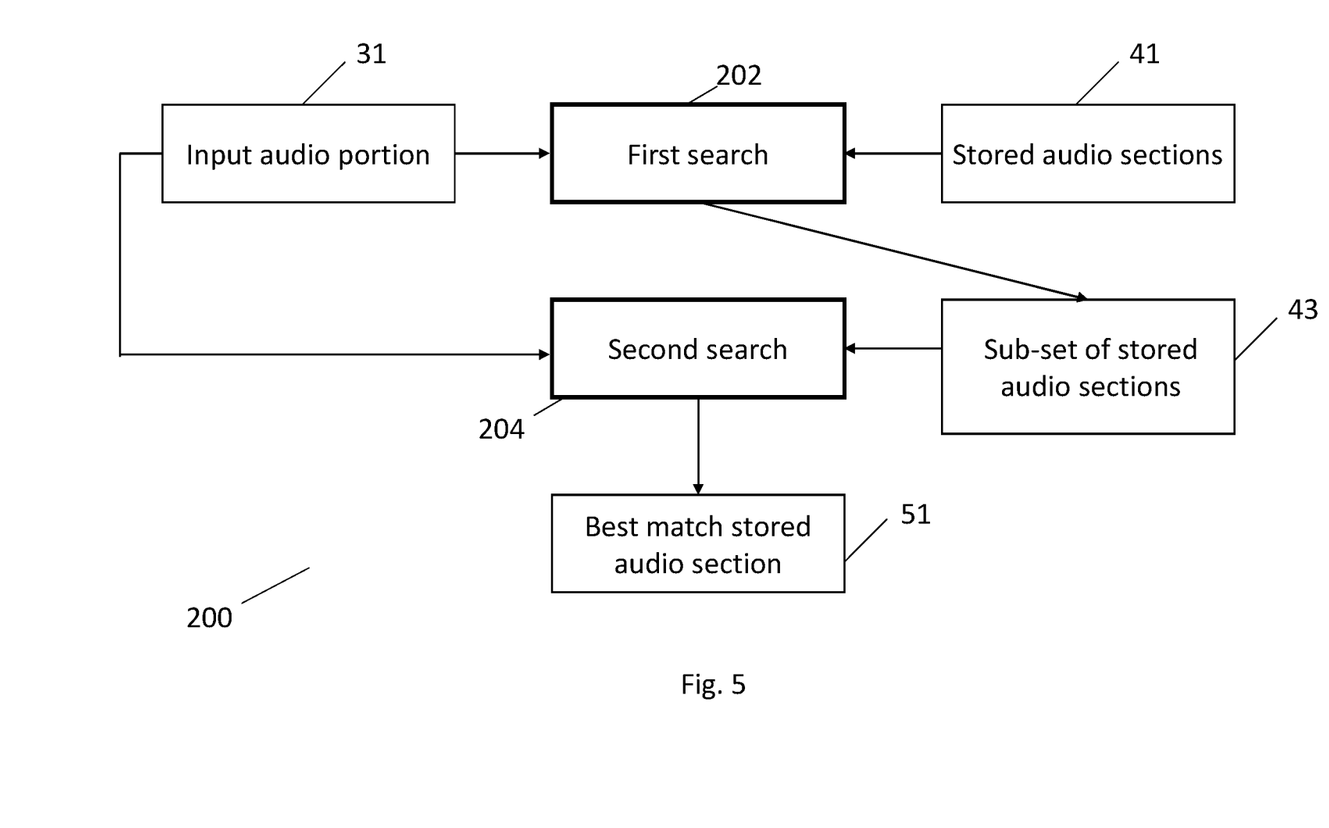
FIG. 5 shows a flow chart of a search algorithm used by the disclosure to determine a best match stored audio section.

FIG. 5 is a flow chart of the search algorithm 200 used to determine the best match stored audio section 51 by comparing an input audio portion 31 and stored audio sections 41. The search algorithm 200 performs a first search 202 and a second search 204.

The first search 202 is used to return a sub-set of stored audio sections 43 that are potential candidates for the best match stored audio section 51. This sub-set comprises the stored audio sections that meet a particular condition outlined by the first search. The condition is based on a primary descriptor, wherein the primary descriptor refers to a single audio parameter with greater importance than the other audio parameters, for example the spectral centroid. Therefore, the first search is performed on the database comprising the audio parameters. The stored audio sections 41 that have a primary descriptor with the same value or within a range of the value of the primary descriptor associated with the input audio portion 31 are included in the sub-set of stored audio sections 43.

The second search 204 calculates a plurality of normalised distances between the audio parameters of the input audio portion 31 and the same audio parameters of each of the stored audio sections included in the sub-set 43. The first similarity score is then calculated for each stored audio section of the sub-set.

The first similarity score is based on the average of the normalised distances for each stored audio section of the sub-set. The normalised distances associated with each audio parameter are weighted in the calculation of the average based on the deemed importance of the corresponding audio parameter. Weighting values may be predetermined or may be user controlled. The second search 204 returns the best match stored audio section 51, which is the section with the largest first similarity score from within the sub-set identified by the first search.

The second similarity score is periodically calculated and compared with the similarity threshold as the input audio signal 30 and the audio sample loaded into the audio engine vary with time. The input audio signal 30 may undergo periodic characterisation as shown in FIG. 3, by separation into a plurality of input audio portions. The audio sample loaded into the audio engine may undergo the same method of periodic characterisation as shown in FIG. 3, by separation into a plurality of loaded audio portions. The second similarity score is based on the sum of the normalised distances from the comparison of the audio parameters of the latest input audio portion and the audio parameters of the latest loaded audio portion.

In this case, the audio parameters are not weighted in the calculation. At each time step, in which a new input audio portion is received and a new loaded audio portion is formed, the latest input audio portion and the latest loaded audio portion are compared to determine the current value of the second similarity score.

Figure 6:
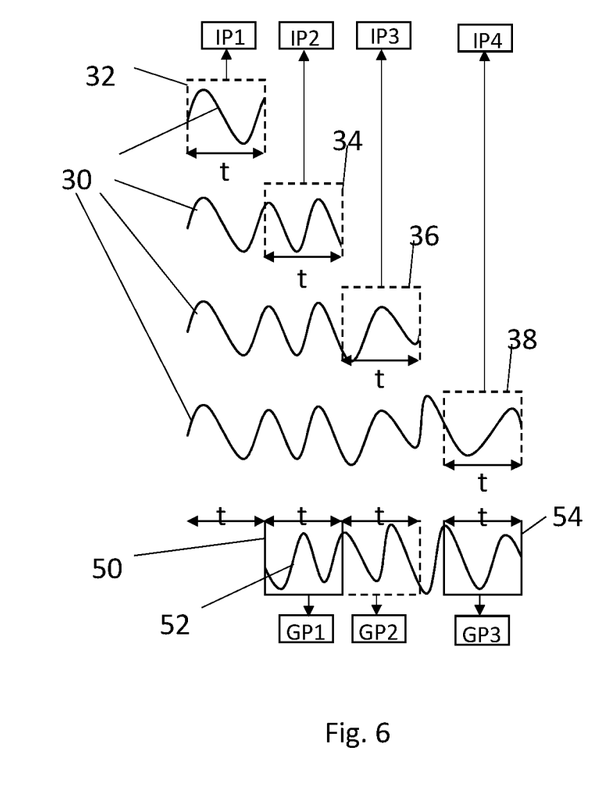
FIG. 6 shows the generation of the composite audio signal.

FIG. 6 illustrates how the composite audio signal 50 is generated over time. The time period t1 associated with the input audio portions and the time period t2 associated with the stored audio sections are equal.

The input audio signal 30 is received, and after a time period t has elapsed, the first input audio portion 32 is defined. The first input audio portion 32 then undergoes analysis and characterisation. After characterisation, the first input audio portion 32 has a description in terms of a first set of input audio parameters IP1. The search algorithm 200 is applied to determine a first best match stored audio section 52 and associated audio sample using the first set of input audio parameters IP1. The associated audio sample of the selected first best match stored audio section 52 is loaded into the audio engine to generate the composite audio signal 50, starting from the first best match stored audio section 52 and proceeding in a sequence of time steps to the end of the audio sample.

After a further time period t, a second input audio portion 34 and a first loaded audio portion have been formed. The second input audio portion 34 and the first loaded audio portion undergo analysis and characterisation. After characterisation, the second input audio portion 34 has a description in terms of a second set of input audio parameters IP2, and the first loaded audio portion has a description in terms of a first set of generated audio parameters GP1. The second set of input audio parameters IP2 is compared with the first set of generated audio parameters GP1, to determine the second similarity score. Based on the outcome of the comparison of the second similarity score with the similarity threshold, the composite audio signal 50 will either continue to be generated from the audio sample loaded into the audio engine, for example if the second similarity score is greater than the similarity threshold, or a different audio sample will be loaded into the audio engine, for example if the second similarity score falls below the similarity threshold.

In a first case, the second similarity score does not fall below the similarity threshold and the audio sample that is loaded into the audio engine continues to be used to generate the composite audio signal 50.

After a further time period t, a third input audio portion 36 and a second loaded audio portion have been formed. The third input audio portion 36 and the second loaded audio portion undergo analysis and characterisation. After characterisation, the third input audio portion 36 has a description in terms of a third set of input audio parameters IP3, and the second loaded audio portion is described in terms of a second set of generated audio parameters GP2. The third set of input audio parameters IP3 is compared with the second set of generated audio parameters GP2, to recalculate the second similarity score.

In a second case, the second similarity score falls below the similarity threshold and the search algorithm 200 is used to find a new second best match stored audio section 54. A new audio sample comprising the new second best match stored audio section 54 is loaded into the audio engine to continue to generate the composite audio signal 50, starting from the new best match stored audio section 54 and proceeding in a sequence of time steps to the end of the audio sample.

As illustrated in FIG. 4, the stored audio sections are defined so that they begin at peaks. Therefore, by waiting until the next peak of the deselected audio sample in the generation of the composite audio signal 50 before appending the new audio sample, and by matching the amplitude of the peaks, it is possible to avoid clicks or other artefacts in the composite audio signal 50. If the end of the selected audio sample is reached before the similarity threshold is crossed, then anew best match stored audio section with associated audio sample is searched for from the audio samples 40.

The present method 100 enables generation of a composite audio signal 50 in real time, that is responsive to changes in the input audio signal 30 that occur in a short time frame, typically less than a second. This is achieved by frequently updating the audio sample 40 that is being used to generate the composite audio signal 50 to ensure that the composite audio signal 50 reflects the changing characteristics of the input audio signal 30.

Using this method 100 it is possible to generate a highly natural sounding composite audio signal 50 comprising pre-recorded audio samples 40, rather than relying on the time consuming manual processing of pre-recorded audio samples. The present method 100 replaces the users voice and dialogue with other pre-recorded audio samples of a certain user defined category (for example, animal recordings or breaking rocks). Features of the input audio signal 30, including its clarity and integrity, are maintained in the composite audio signal 50, despite the input audio signal 30 itself not being present in the composite audio signal 50.

Optionally, the input audio signal 30 (or a processed version of the input audio signal 30) can be mixed in with the generated composite audio signal 50 during playback. This can further improve the clarity of dialogue in the mixed audio signal.

A second embodiment of a method of generating the composite audio signal 50 will now be described. This method omits the use of a similarity threshold for performing a new match when the similarity of the stored audio section to the input audio signal 30 falls below the threshold. Instead it uses a "multi-voice" approach.

As before, a library of stored audio portions is analysed and characterised in terms of a number of audio parameters. This allows matching of the stored audio portions with the incoming audio signal.

In this embodiment, the audio engine uses a number of "voices", where each voice comprises a plurality of sequential stored audio portions from the library being played back. The portion that each voice plays back represents the best match with the incoming audio at that time. A typical number of voices used is four voices although this may be variable. The voices are played back simultaneously or in parallel. Each voice will be similar and this creates a denser, but more naturalistic sound.

All the stored audio portions have the same fixed length or duration. A typical length is one second. In this embodiment, each selected stored audio portion is played from start to end. In other words, there is no comparison with a similarity threshold during playback and playback is never interrupted to replace the audio portion with another one.

Once play back of the audio portion has finished, a new best match is selected and playback of the new audio portion commences from this point. This is done for each voice.

The start time of each voice is offset. The offset used is the inverse ratio of the number of voices used. Therefore, when four voices are used, and the duration of one second, the start time of the second voice is offset a quarter second from that of the first. Similarly, the start time of the third voice is offset a quarter second from that of the second and the start time of the fourth voice is offset a quarter second from that of the third.

The similarity of a stored audio portion to the input audio signal will be high at the start of playback but may decrease as playback continues. Although, the stored audio portion of each voice is played from start to end, any dissimilarity that arises will be masked by the other voices which are closer to the start of playback and therefore more similar.

Each played audio portion has an amplitude window applied. This allows for a constant power output during playback, with no discontinuities in the composite waveform when playback for each portion starts and ends. The composite output then has its amplitude modulated by an envelope follower which tracks the amplitude of the incoming audio.

Each voice has an amplitude window applied to it so that there are no discontinuities in the audio when the voice changes to a new portion, and so that an equal power output is maintained throughout playback. The 'crossfade time' is the length of this window, which will can be altered dynamically.

Various modifications and improvements can be made to the above without departing from the scope of the disclosure.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

The invention claimed is:

1. A method of generating a composite audio signal comprising only a plurality of sections of stored audio signals in a real-time manner, the method comprising the steps of:
   (a) receiving an input audio signal;
   (b) performing, in a real-time manner, a first comparison of the input audio signal with one or more stored audio signals, wherein the first comparison comprises the sub-steps of:
      (i) comparing a first portion of the input audio signal with a plurality of sections of one or more stored audio signals, the first portion of the input audio signal being less than an entirety of the input audio signal;
      (ii) selecting a first section of one of the stored audio signals based on a result of the comparison with the first portion of the input audio signal, the result identifying a similarity between the first portion of the input audio signal and the selected first section of the one of the stored audio signals;
      (iii) using the selected first section as a first portion of the composite audio signal and continuing to monitor the identified similarity between the selected first section and the first portion of the input audio signal;
      (iv) after a time period, comparing a second subsequent portion of the input audio signal with a second subsequent section of the selected one of the stored audio signals and either:
         (1) if the second subsequent section of the selected one of the stored audio signals is similar to the second subsequent portion of the input audio signal, using the second subsequent section as a second subsequent portion of the composite audio signal; or
         (2) if the second subsequent section of the selected one of the stored audio signals is not similar to the second subsequent portion of the input signal:
            a. selecting another section of another of the stored audio signals based on a result of the comparison with the second portion of the input audio signal, the result identifying a similarity between the second portion of the input audio signal and the selected another section of the another of the stored audio signals; and
            b. using the selected another section as the second subsequent portion of the composite audio signal;
   (c) following step (b), generating, in a real-time manner, the composite audio signal comprising only the first portion and the second subsequent portion of the composite audio signal; and
   (d) repeating steps (b) and (c) for the duration of the input audio signal, such that the duration of the input audio signal and the duration of the composite audio signal are substantially the same,
   wherein each of the first and second portions of the input audio signal have the same duration as the respectively selected sections of the stored audio signals.

2. The method of claim 1, wherein the generated composite audio signal comprises a plurality of sequential sections of at least one of the stored audio signals.

3. The method of claim 1, wherein each of the respectively selected sections of the stored audio signals has a duration that is less than a second.

4. The method of claim 1, wherein each stored audio section begins at a peak in amplitude of a stored audio signal.

5. The method of claim 1, wherein the input audio signal is separated into a plurality of portions as it is being received.

6. The method of claim 1, wherein each stored audio signal is characterized in terms of one or more audio parameters.

7. The method of claim 6, wherein each stored audio signal is characterized prior to receiving the input audio signal, and wherein each audio parameter is stored.

8. The method of claim 7, wherein the first comparison comprises:
   determining a first similarity score by:
      analyzing the first portion of the input audio signal;
      characterizing the analyzed first portion of the input audio signal in terms of one or more audio parameters based on the analysis; and
      comparing each audio parameter of the portion with each corresponding stored audio parameter.

9. The method of claim 1, further comprising performing an additional comparison of the input audio signal with the selected second subsequent section.

10. The method of claim 1, wherein the additional comparison comprises, after a first time period, determining a second similarity score based on the similarity between the input audio signal and the selected second subsequent section.

11. The method of claim 10, further comprising continuing to generate the composite audio signal using the selected second subsequent section if the second similarity score is above a predetermined similarity threshold.

12. The method of claim 10, further comprising, if the second similarity score is below the predetermined similarity threshold, performing a first search for identifying a sub-set of stored audio portions beyond the previously selected one or the another of the stored audio signals that are potential candidates for a best match with the second portion of the input audio signal.

13. The method of claim 12, wherein the first search identifies a best matching primary audio parameter of the stored audio portions.

14. The method of claim 12, further comprising performing a second search comprising:
   analyzing the second portion of the input audio signal;
   characterizing the analyzed second portion of the input audio signal in terms of one or more audio parameters based on the analysis; and
   comparing each audio parameter of the second portion with each corresponding audio parameter of the sub-set of stored audio portions.

15. The method of claim 14, wherein the second search comprises calculating a normalized distance between one or more audio parameters of the input audio portion and the corresponding audio parameter of each of the sub-set of stored audio portions.

16. The method of claim 15, further comprising weighting one or more of the calculated normalized distances.

17. The method of claim 1, wherein the stored audio signals comprise at least one of animal, alien, or monster sounds.

18. The method of claim 1, wherein the generated composite audio signal comprises a plurality of parallel audio signals.

19. The method of claim 18, wherein each of the plurality of parallel audio signals comprises a plurality of stored audio portions.

20. The method of claim 19, wherein each of the stored audio sections has the same duration.

21. The method of claim 18, wherein the start time of each of the plurality of parallel audio signals is offset.

22. The method of claim 21, wherein the offset comprises the inverse ratio of the number of parallel audio signals used.

23. An apparatus configured to generate a composite audio signal comprising only a plurality of sections of stored audio signals in a real-time manner, said apparatus comprising:
   an input for receiving an input audio signal;
   a memory for storing one or more audio signals; and
   a processor configured to:
   (a) perform, in a real-time manner, a first comparison, wherein a first portion of the input audio signal is compared with a plurality of sections of one or more stored audio signals, wherein the first portion of the input audio signal is less than an entirety of the input audio signal;
   (b) select, in a real-time manner, a first section of one of the stored audio signals based on a result of the first comparison with the first portion of the input audio signal, the result identifying a similarity between the first portion of the input audio signal and the selected first section of the one of the stored audio signals;
   (c) use the selected first section as a first portion of the composite audio signal and continue to monitor the identified similarity between the selected first section and the first portion of the input audio signal;
   (d) after a time period, perform, in a real-time manner, a second comparison, wherein a second subsequent portion of the input audio signal is compared with a second subsequent section of the selected one of the stored audio signals and either:
      (1) if the second subsequent section of the selected one of the stored audio signals is similar to the second subsequent portion of the input audio signal, using the second subsequent section as a second subsequent portion of the composite audio signal; or
      (2) if the second subsequent section of the selected one of the stored audio signals is not similar to the second subsequent portion of the input signal:
         a. select, in a real-time manner another section of another of the stored audio signals based on a result of the comparison with the second portion of the input audio signal, the result identifying a similarity between the second portion of the input audio signal and the selected another section of the another of the stored audio signals; and
         b. use the selected another section as the second subsequent portion of the composite audio signal;
   (e) following (a)-(d), generate, in a real-time manner, the composite audio signal comprising only the first portion and the second subsequent portion of the composite audio signal; and
   (f) repeating steps (b) through (e) for the duration of the input audio signal, such that the duration of the input audio signal and the duration of the composite audio signal are substantially the same,
   wherein each of the first and second portions of the input audio signal have the same duration as the respectively selected sections of the stored audio signals.

24. The apparatus of claim 23, comprising a plugin for a digital audio workstation or a library for real-time audio processing.

25. A computer program product comprising at least one non-transitory computer-readable storage medium having computer-readable instructions embodied therein for generating a composite audio signal comprising only a plurality of sections of stored audio signals, the computer-readable instructions comprising at least one executable portion configured for:
   (a) receiving an input audio signal;
   (b) performing, in a real-time manner, a first comparison, wherein a first portion of the input audio signal is compared with a plurality of sections of one or more stored audio signals, wherein the first portion of the input audio signal is less than an entirety of the input audio signal;
   (c) selecting, in a real-time manner, a first section of one of the stored audio signals based on a result of the first comparison with the first portion of the input audio signal, the result identifying a similarity between the first portion of the input audio signal and the selected first section of the one of the stored audio signals;
   (d) using the selected first section as a first portion of the composite audio signal and continuing to monitor the identified similarity between the selected first section and the first portion of the input audio signal;
   (e) after a time period, performing, in a real-time manner, a second comparison, wherein a second subsequent portion of the input audio signal is compared with a second subsequent section of the selected one of the stored audio signals and either:
      (1) if the second subsequent section of the selected one of the stored audio signals is similar to the second subsequent portion of the input audio signal, using the second subsequent section as a second subsequent portion of the composite audio signal; or
      (2) if the second subsequent section of the selected one of the stored audio signals is not similar to the second subsequent portion of the input signal:
         a. selecting another section of another of the stored audio signals based on a result of the comparison with the second portion of the input audio signal, the result identifying a similarity between the second portion of the input audio signal and the selected another section of the another of the stored audio signals; and
         b. using the selected another section as the second subsequent portion of the composite audio signal;
   (f) following (a)-(e), generating, in a real-time manner, the composite audio signal comprising only the first portion and the second subsequent portion of the composite audio signal; and
   (g) repeating steps (b) to (f) for the duration of the input audio signal, such that the duration of the input audio signal and the duration of the composite audio signal are substantially the same,
   wherein each of the first and second portions of the input audio signal have the same duration as the respectively selected sections of the stored audio signals.

26. The method of claim 2, wherein the sequence of sections of the generated composite signal resembles human speech.

* * * * *